United States Patent [19]
Cutler

[11] 3,714,607
[45] Jan. 30, 1973

[54] ACOUSTO-OPTIC METHOD AND APPARATUS FOR MODE DECOUPLING A RING LASER

[75] Inventor: Leonard S. Cutler, Los Altos Hills, Calif.

[73] Assignee: Hewlett-Packard Company, Palo Alto, Calif.

[22] Filed: Aug. 7, 1970

[21] Appl. No.: 61,915

[52] U.S. Cl. ............................ 332/7.51, 356/106 RL
[51] Int. Cl. ................................................ H01s 3/11
[58] Field of Search .............. 356/106 RL; 331/94.5; 332/7.51; 350/160

[56] References Cited

UNITED STATES PATENTS

| | | | |
|---|---|---|---|
| 3,471,804 | 10/1969 | Bridges et al. | 331/94.5 |
| 3,395,367 | 7/1968 | Bell et al. | 356/106 |

FOREIGN PATENTS OR APPLICATIONS

| | | | |
|---|---|---|---|
| 1,427,028 | 11/1966 | France | 356/106 RL |

OTHER PUBLICATIONS

Buholz, "Acoustic Wave Amp Modulation"..., 11/67, Pg. 454-459, IBBB JQR, Vol. QR-3, No. 11, Electro Technology, 9-69, Pg. 40
Catherin, "Traveling-wave Laser Gyrocompass" 11/67, Pg. 449-453, IBBB JQR, QR-3, No. 11
Harris, "Acousto Optic Tunable Filter," 6/69, Pg. 744-747, JOSA Vol. 59, No. 6
Hutchings, "Amp & Frequency Characteristics of a Rig Laser" 12/2/66, Pg. 467-473, Physical Review, Vol. 15R, No. 1

Primary Examiner—Benjamin A. Borchelt
Assistant Examiner—N. Moskowitz
Attorney—Roland I. Griffin

[57] ABSTRACT

An acousto-optic method and apparatus is disclosed for mode decoupling a ring laser. A pair of acousto-optic filters is disposed in the optical path of the ring laser for collinearly diffracting the counter rotating light beams on acoustic waves in the acousto-optic filters to shift apart the optical frequencies of the counter rotating light beams in the laser gain medium by a certain frequency related to the frequency of the acoustic waves to prevent mode locking of the optical frequencies of the counter rotating light beams. A rotation rate sensor employing the mode decoupled ring laser is disclosed.

7 Claims, 1 Drawing Figure

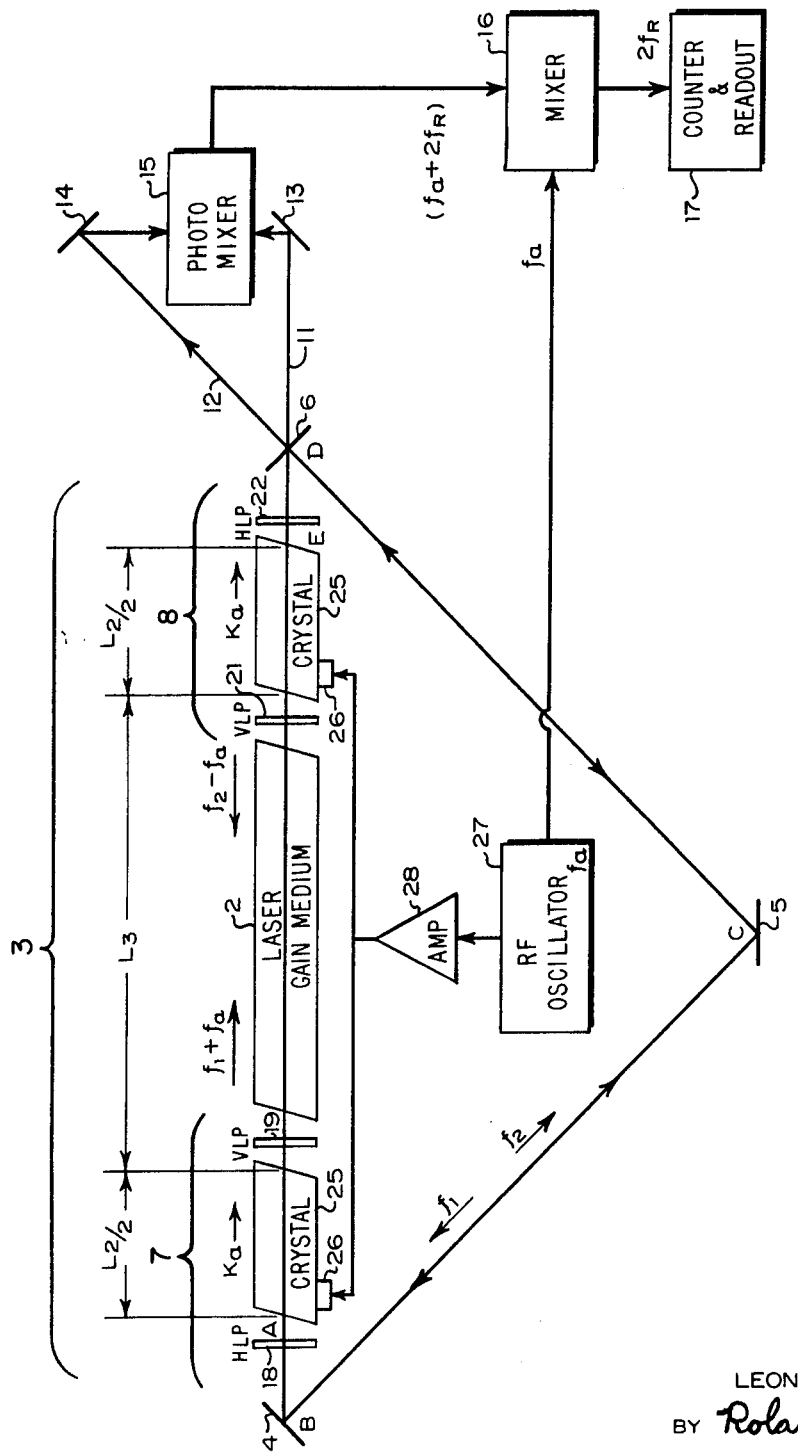

ACOUSTO-OPTIC METHOD AND APPARATUS FOR MODE DECOUPLING A RING LASER

BACKGROUND OF THE INVENTION

Heretofore, attempts have been made to prevent frequency locking between the counter rotating light beams in a ring laser employed for rotation sensing. One of the prior attempts has involved the use of an acousto-optic crystal in the optical ring path of the laser for modulating the counter rotating beams in such a manner as to prevent both beams from having the same frequency or nearly the same frequency in the laser medium at the same time. Such acousto-optic modulators for mode decoupling are described in an article titled "Acoustic Wave Amplitude Modulation of a Multimode Ring Laser" appearing in the IEEE Journal of Quantum Electronics, Volume QE-3, No. 11, of November, 1967. In this article experiments are described wherein frequency locking of the counter rotating light beams was successful down to a beat frequency lower range of approximately 150 Hz. However, attempts to get below 150 Hz were not successful utilizing this prior art technique.

It is also known from the prior art that electronically tunable acousto-optic filters have been constructed. In these prior art filters, light of a first polarization is collinearly diffracted on an acoustic wave in an optically birefringent crystal to shift the polarization of light to an orthogonal polarization at an optical frequency related to the acoustic frequency. The bandpass frequency of the acousto-optic filter has been electrically tunable by varying the frequency of the acoustic wave. Such an acousto-optic filter is disclosed in an article titled "Acousto-Optic Tunable Filter" appearing in the Journal of the Optical Society of America, Volume 59, No. 6, of June 1969, pages 744–747.

SUMMARY OF THE INVENTION

The principal object of the present invention is the provision of an improved acousto-optic method and apparatus for mode decoupling a ring laser.

One feature of the present invention is the provision, in a ring laser, of acousto-optic means disposed in the optical path of the ring laser for substantially collinearly diffracting the counter rotating light beams on acoustic waves in the acousto-optic means to shift apart the optical frequencies of the counter rotating light beams in the laser gain medium via a certain frequency related to the frequency of the acoustic waves to prevent frequency locking of the optical frequencies of the counter rotating light beams.

Another feature of the present invention is the same as the preceding feature wherein the acousto-optic means comprises first and second acousto-optic filters, the first one of the filters being arranged to shift the frequency of one of the counter rotating light beams up in frequency and the second filter being arranged to shift the frequency of the other counter rotating light beam down in frequency, and the laser medium being disposed in the optical path of the ring laser between the first and second acousto-optic filters.

Another feature of the present invention is the same as any one or more of the preceding features wherein the acousto-optic means includes an optically anisotropic medium disposed to receive one of the counter rotating light beams of a first polarization, includes an acoustic transducer for producing in the anisotropic medium an acoustic wave that is collinear with the path of this polarized light beam for collinearly diffracting the light beam of the first polarization on the acoustic wave to shift the polarization of the diffracted light beam to a second polarization, and includes means for polarization analyzing the diffracted light beam to filter out light in the counter rotating light beam that is not shifted from the first polarization to the second polarization.

Another feature of the present invention is the same as any one or more of the preceding features including means for withdrawing a portion of each of the counter rotating light beams from the optical path of the ring laser and comparing the optical frequencies of the withdrawn portions of the counter rotating light beams to obtain an output representative of the frequency difference between the optical frequencies of the counter rotating light beams, whereby a rotation sensor is obtained.

Other features and advantages of the present invention will become apparent upon a perusal of the following specification taken in connection with the accompanying drawing.

DESCRIPTION OF THE DRAWING

The drawing is a schematic line diagram, partly in block diagram form, depicting a ring laser rotation sensor incorporating features of the present invention.

DESCRIPTION OF THE PREFERRED EMBODIMENTS

Referring now to the drawing, there is shown a ring laser rotation sensor system incorporating features of the present invention. This ring laser system includes a laser gain tube 2 such as a helium-neon gas tube similar, for example, to that described in the aforecited Journal of Quantum Electronics article of November, 1967. The laser gain tube 2 is disposed in one leg 3 of a triangular ring laser optical beam path defined between three mirrors 4, 5 and 6 disposed at the corners of the triangular ring laser optical beam path.

A pair of acousto-optic filters 7 and 8 are disposed in the same leg 3 of the ring laser optical beam path as the laser gain tube 2 and on opposite sides of the laser gain tube 2. The acousto-optic filters 7 and 8 are of the type disclosed in the aforecited article titled "Acousto-Optic Tunable Filter" appearing in the Journal of the Optical Society of America in June of 1969. The acousto-optic filters 7 and 8 are formed and arranged to provide an optical bandpass characteristic within the operating frequency range of the laser gain tube 2, taking into account the distance around the ring laser path optical beam. Therefore, the ring laser oscillates simultaneously in two modes of oscillation, one corresponding to an optical beam rotating around the ring laser optical beam path in the clockwise direction and another corresponding to an optical beam rotating around the ring laser optical beam path in the counterclockwise direction. A typical ring laser rotation sensor is disclosed and claimed in U.S. Pat. No. 3,320,850 issued May 23, 1967, and assigned to the same assignee as the present invention.

In operation, as a rotation sensor, rotation of the ring laser about an axis normal to the plane of the ring laser optical beam path causes one of the counter rotating optical beams having a nominal optical frequency $f_1$ to be shifted up in frequency by a small frequency $f_R$ corresponding to the rate of rotation, and causes the other counter rotating optical beam having a nominal frequency $f_2$ to be shifted down in frequency by the same frequency $f_R$. Portions 11 and 12 of these clockwise and counterclockwise optical beams are extracted from the ring laser via partially reflective mirror 6 and are reflected via mirrors 13 and 14 into a photomixer 15 wherein they are mixed to derive the beat frequency of $f_a + 2f_R$. This beat frequency is fed to mixer 16 for mixing with a sample of the acoustic frequency $f_a$ to derive an output at $2f_R$. This output is fed to a counter 17 where it is counted to derive a rotation rate output that is a measure of the rate of rotation. If desired, additional output circuitry may be provided in the manner as previously disclosed and claimed in U.S. Pat. No. 3,320,850 to also detect the sense of rotation.

The acousto-optic filters 7 and 8 serve to prevent frequency locking of the two counter rotating modes of oscillation when the rates of rotation are very low, such as when measuring the rate of rotation of the earth. Heretofore, it has been found, when the rate of rotation is very low, that the frequency shifts of the counter rotating optical beams are very low, and, if the two counter rotating beams have approximately the same or very nearly the same frequency in the laser gain medium, the two beams tend to lock to a common frequency, thereby preventing measurement of low rates of rotation. The filters 7 and 8 serve to shift the frequencies of the counter rotating optical beams apart in the laser gain medium to prevent this locking action, thereby permitting operation to very low rates of rotation. More specifically, assume that a clockwise rotating light beam of nominal optical frequency $f_1$ enters the first acoustic filter 7 from the left. The acoustic filter 7 is arranged to collinearly diffract the clockwise rotating light beam, which is forced to be polarized in the horizontal linear direction by horizontal linear polarizer 18, on an acoustic wave of acoustic frequency $f_a$ in the birefringent crystal of the filter to change the polarization of the clockwise rotating light beam from the horizontal to the vertical direction for optical frequencies within the passband of the filter. The vertically polarized output light beam is converted up in frequency to $(f_1 + f_a)$ by the frequency $f_a$ of the acoustic wave and passes through vertical linear polarizer 19 into the laser gain medium of laser gain tube 2 and thence to the second acousto-optic filter 8. In the second acousto-optic filter 8, the vertically polarized light passes through vertical linear polarizer 21 and thence is collinearly diffracted on the acoustic wave of frequency $f_a$ in the second birefringent crystal 25 to convert the optical frequency $(f_1 + f_a)$ down in frequency by the acoustic frequency $f_a$ and to the horizontal polarization such that the output light beam, which travels in the clockwise direction, is converted back to the original frequency $f_1$ and horizontal to the polarization and continues to pass around the ring path through horizontal linear polarizer 22.

On the other hand, the counterclockwise rotating beam of nominal optical frequency $f_2$ and horizontal polarization enters the second acousto-optic filter 8 from the right, is converted down in frequency to $(f_2 - f_a)$ via the same interaction previously referred to and converted to vertical polarization, and thence passes through the laser gain medium 2 and into the first acousto-optic filter 7 wherein the optical frequency is converted up in frequency by the acoustic frequency $f_a$ such that the output of the first acousto-optic filter 7 for the counterclockwise rotating beam is $f_2$. In this manner, the optical frequencies for the clockwise and counterclockwise rotating beams in the laser gain medium are displaced in frequency to prevent locking of the frequencies of the two counter rotating modes. Thus the provision of the acousto-optic filters in the arrangement as shown herein prevents locking of the counter rotating modes of oscillation thereby permitting measurement of very small rotation rates.

Each of the acousto-optic filters 7 and 8 includes a pair of cross-polarized linear polarizers at opposite ends of an optically anisotropic medium 25 such as a birefringent crystal. Suitable examples of such birefringent crystals include $LiNbO_3$, $PbMoO_4$, or $CaMoO_4$. Each crystal 25 includes an acoustic transducer 26 disposed at one end thereof for generating a shear acoustic wave (at the acoustic frequency) which is reflected from an internal input face of the crystal into a direction along the longitudinal axis of the crystal and parallel to the optical beam path for collinear diffraction of the counter rotating light beams. Each acoustic transducer 26 is driven at the acoustic frequency $f_a$ via RF energy supplied from an RF oscillator 27 at the acoustic frequency $f_a$, and the output of the oscillator 27 is amplified via a power amplifier 28 and thence fed to drive the transducers 26.

The acousto-optic light filters 7 and 8 make use of collinear acousto-optic diffraction in an optically anisotropic birefringent medium. More particularly, a crystal orientation for crystals 25 is chosen such that the incident linearly polarized light beam is collinearly diffracted on the acoustic wave from the input polarization into a second orthogonal polarization. For a given acoustic frequency $f_a$, only a small range of light frequencies satisfies a momentum vector $\bar{k}$ matching condition to obtain cumulative collinear diffraction. If the acoustic frequency is changed, the band of light frequencies which the acousto-optic filter will diffract from the first polarization into the second polarization is changed. Diffraction into the second polarization occurs via the photoelastic constant of the crystal and is only cumulative if $|k_o| - |k_e| = |k_a|$ where the subscripts $o$, $e$ and $a$ denote the ordinary and extraordinary optical waves and the acoustic wave, respectively. This will be the case if the optical and RF acoustic frequencies $f_o$ and $f_a$ are related by:

$$f_o = (cf_a)/(V|\Delta n|) \qquad \text{Eq. (1)}$$

where $c/V$ is the ratio of the optical velocity in vacuum to the acoustic velocity in the medium and $\Delta n$ is the birefringence of the crystal.

The half power bandwidth of the bandpass through the optical filter is defined by the following relation:

$$B.W. \approx (1/|\Delta n|L) \text{ cm}^{-1} \qquad \text{Eq. (2)}$$

where B.W. is the half power bandwidth of the passband in wave number or waves per centimeter, $L$ is the interaction length in centimeters of the optical and acoustic fields within the crystal, and $\Delta n$ is the birefringence of the crystal.

The percent light transmission through the optical filter at the bandpass optical frequency $f_o$ has a characteristic which is a function of the acoustic power density within the crystal 25. In the case of the illustrated ring laser system, the acoustic filters are driven with sufficient acoustic power such that the power density within the birefringent crystals yields essentially 100 percent transmission within the optical bandpass of the acoustic filters. In a typical example, employing lithium niobate, the wavelength of light which is diffracted from the first polarization to the second polarization is tunable from 7,000 to 5,500 A. by changing the acoustic frequency from 750 to 1050 MHz. For a birefringent crystal 25 which is 5 cm long, the instantaneous bandpass for the tunable optical frequency is less than 2 A. Actually, in passage through the filter the frequency of the optical wave is converted up or down in frequency by the acoustic frequency $f_a$, and whether the optical frequency is converted up or whether it is converted down in frequency depends upon the relative directions of the acoustic wave and the optical wave and the direction of polarization of the optical wave with respect to the axes of the birefringent crystal. To be more specific, the optical frequency will be up-converted if the incident polarization vector lies in the direction of smaller index of refraction and the light and acoustic waves travel in the same direction. If either the polarization or the relative direction of travel of light and acoustic waves is changed, but not both, the optical frequency will be down-converted. If both are changed, the optical frequency will be up-converted.

In the illustrated ring laser system, both birefringent crystals 25 are oriented the same way and the acoustic waves travel in the same direction in both of them. Thus, light traveling in the clockwise direction is up-converted in the first crystal, passes through the laser active medium, and is then down-converted in the second crystal back to its original frequency. Light traveling in the opposite direction encounters the second crystal first and is down-converted. It then proceeds through the laser active medium and encounters the first crystal, where it is up-converted back to its original frequency.

The nominal optical frequencies $f_1$ and $f_2$ for the clockwise and counterclockwise rotating beams, respectively, are related by the following equations:

$$L_1 f_a + nL_2(f_1 + f_a) + L_3(f_1 + f_a) = Nc \qquad \text{Eq. (3)}$$

$$L_1 f_2 + nL_2(f_2 - f_a) + L_3(f_2 - f_a) = Nc \qquad \text{Eq. (4)}$$

$$\text{or } f_1 = f_2 - 2f_a(nL_2 + L_3)/(L_1 + nL_2) + L_3 \qquad \text{Eq. (5)}$$

where $n$ is the index of refraction for the diffracted optical wave, $c$ is the velocity of light, $N$ is the number of wavelengths in the optical path of the ring laser, $L_1$ is the path length from A to B + B to C + C to D + D to E, $L_2$ is the total path length through both crystals, and $L_3$ is the short path length between the crystals taken through the laser gain tube 2.

For the special case where $L_1$ is chosen equal to $nL_2 + L_3$ and neglecting dispersion in $n$ and in the laser gain tube 2 then:

$$f_1 = f_2 - f_a \qquad \text{Eq. (6)}$$

This is the case illustrated in the drawing such that the acoustic frequency $f_a$ is heterodyned out in mixer 16 to leave $2f_R$ as the output to be counted. However, the aforecited special case is not a requirement, as the frequency difference between $f_1$ and $f_2$, in the absence of rotation, is readily ascertained, and the output of the counter 17 is easily calibrated by adjusting the zero count of the output measurement to account for the non-rotational frequency difference between the optical frequencies of the counter-rotating optical beams. Also the output optical beams need not be taken from the same mirror 6. One may be taken from mirror 6 and the other taken from the optical path $L_3$. Also the separate polarizers 18, 19, 21, and 22 need not be provided as only one polarizer is needed in the ring laser path. This polarizer can be incorporated in any one of the elements in the ring laser optical path, such as in one of the mirrors 4, 5, or 6 or one of the Brewster angle windows in the ring laser optical beam path.

As used herein, "light" is defined as electromagnetic radiation. Such light need not be confined to the visible spectrum.

The benefits of collinear diffraction are: (1) the stringent angular tolerance characteristic of Bragg diffraction is relaxed (angular divergence of the incident light beam contributed only a second order shift in the passband which is a cosine of the angle between the acoustic K vector and the incident optical K vectors); and (2) the interaction volume of the acoustic and optical beams is enhanced because of the collinear propagation (—therefore, the efficiency of light conversion can be increased to nearly 100 percent and the acoustic power required for efficient conversion drastically decreased—).

In some birefringent crystals the phase velocity K vector and the group velocity are not collinear. The angle between them may be as much as 20°, as in the case of quartz. In such a case, the light beam may be collinear with either the phase or the group velocity with corresponding advantages and disadvantages.

If the light beam is collinear with the phase velocity, the advantage of cosine dependence of bandwidth center frequency upon divergence is retained with the disadvantage that the light beam soon walks out of the acoustic beam because the energy propagates in the direction of the group velocity and is not collinear with the light beam. Thus, narrow band characteristics can be obtained in this case at the expense of either larger acoustic aperture or higher acoustic power.

On the other hand, if the light beam is made collinear with the group velocity, the advantage of efficient utilization of acoustic energy is retained but the angle between the acoustic K vector and the optical K vector is no longer zero and the shift in the center of the optical passband with divergence in the optical beam is a function of the cosine of the angle between the acoustic and optical K vectors which is no longer zero. This results in a wider passband with the same angular divergence. In intermediate cases where propagation is neither exactly collinear with either the phase or the group velocity, corresponding tradeoffs occur. In those birefringent crystals in which the phase velocity and group velocity are collinear, non-collinear propagation of light in the filter contributes similar deleterious effects to the filter. Therefore, as used herein, substantially collinear means that the light and acoustic K vectors are sufficiently collinear to retain the advantages of efficient acoustic power utilization and consistent with the required passband filter characteristics.

As seen from Eq. (2), the bandwidth of the acousto-optic filter is inversely related to the length of the interaction path L through the crystal. In resonant acousto-optic filters, the path length can be relatively short and, thus, the bandwidth is relatively wide. In such cases the K vectors for the optical and acoustic waves can have substantial divergence while still retaining the benefits of collinear diffraction since the acousto-optic interaction is relatively high Q and the interaction falls off only as the cosine of the angle of divergence.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A ring laser comprising:
   means for defining an optical ring path;
   means, including a laser gain medium positioned in said optical ring path, for producing laser light beams counter rotating about said optical ring path; and
   acousto-optic means positioned in said optical ring path for substantially collinearly diffracting the counter rotating laser light beams on acoustic waves in said acousto-optic means to shift apart the optical frequencies of the counter rotating laser light beams in the laser gain medium by a frequency related to the frequency of the acoustic waves to prevent frequency locking of the optical frequencies of the counter rotating laser light beams.

2. A ring laser as in claim 1 wherein:
   said acousto-optic means includes first and second acousto-optic filters, one of said acousto-optic filters being arranged to shift the frequency of the clockwise rotating laser light beam up in frequency and the other of said acousto-optic filters being arranged to shift the frequency of the counter-clockwise rotating laser light beam down in frequency; and
   said laser gain medium is disposed in said optical ring path between said first and second acousto-optic filters.

3. A ring laser as in claim 2 wherein each of said acousto-optic filters includes:
   an optically anisotropic medium disposed to receive one of the counter rotating laser light beams of a first polarization;
   means for producing in the optically anisotropic medium an acoustic wave that is collinear with the path of the laser light beam of the first polarization in the optically anisotropic medium;
   said optically anisotropic medium substantially collinearly diffracting the laser light beam of the first polarization on the acoustic wave to shift the polarization of the diffracted laser light beam to a second polarization; and
   means for polarization analyzing the collinearly diffracted laser light beam to filter out light therein that was not shifted from the first polarization to the second polarization.

4. A ring laser as in claim 3 wherein said optically anisotropic medium is an optically birefringent medium.

5. A ring laser as in claim 4 wherein said birefringent medium is a birefringent crystal.

6. A ring laser as in claim 5 including:
   means for withdrawing a portion of each of the counter rotating laser light beams from said optical ring path; and
   means for comparing the optical frequencies of the withdrawn portions of the counter rotating laser light beams to obtain an output representative of the frequency difference between the optical frequencies of the counter rotating laser light beams.

7. A ring laser as in claim 1 including:
   means for withdrawing a portion of each of the counter rotating laser light beams from said optical ring path; and
   means for comparing the optical frequencies of the withdrawn portions of the counter rotating laser light beams to obtain an output representative of the frequency difference between the optical frequencies of the counter rotating laser light beams.

* * * * *